United States Patent [19]

Beach et al.

[11] 3,831,197

[45] Aug. 20, 1974

[54] ARTICLE HANDLING AND DATA RETRIEVAL

[75] Inventors: Laurence R. Beach; Bjarne Junge; Henry J. Zentgraf, all of Boulder, Colo.

[73] Assignee: International Business Machines Corporation, Armonk, N.Y.

[22] Filed: Nov. 15, 1971

[21] Appl. No.: 198,877

[52] U.S. Cl. ............360/71, 360/92, 214/16.4 A, 214/16.4 R, 214/16.1 A

[51] Int. Cl. ............ G11b 23/04

[58] Field of Search ... 340/172.5; 235/61.6, 151.11; 214/16.4; 360/71, 78, 88, 92

[56] References Cited

UNITED STATES PATENTS

| | | | |
|---|---|---|---|
| 3,200,380 | 8/1965 | MacDonald et al. | 340/172.5 |
| 3,240,365 | 3/1966 | King | 214/16.4 A |
| 3,260,349 | 7/1966 | Vander Meer | 340/172.5 |
| 3,335,407 | 8/1967 | Lange et al. | 340/172.5 |
| 3,336,582 | 8/1967 | Beausoleil et al. | 340/172.5 |
| 3,378,827 | 4/1968 | Hertrich | 360/92 |
| 3,402,836 | 9/1968 | DeBrey et al. | 214/16.4 A |
| 3,550,133 | 12/1970 | King et al. | 340/172.5 |
| 3,568,862 | 3/1971 | Walkhoff et al. | 214/16.4 A |
| 3,569,682 | 3/1971 | Tipton et al. | 235/151.11 |
| 3,575,265 | 4/1971 | Simjian | 235/61.6 R |
| 3,584,284 | 6/1971 | Beach et al. | 318/569 |
| 3,610,159 | 10/1971 | Fickenscher | 340/172.5 |
| 3,613,910 | 10/1971 | Weir | 214/16.4 |
| 3,643,068 | 2/1972 | Mohan et al. | 235/61.12 N |

FOREIGN PATENTS OR APPLICATIONS

| | | | |
|---|---|---|---|
| 700,213 | 12/1964 | Canada | 340/174.1 C |

OTHER PUBLICATIONS

"Data Processing System" by R. R. Bowdle, IBM Technical Disclosure Bulletin, Vol. 3, No. 5, Oct. 1960, p. 24, 25.

*Primary Examiner*—Gareth D. Shaw
*Attorney, Agent, or Firm*—Herbert F. Somermeyer

[57] ABSTRACT

Plural accessing means selectively store and fetch articles, preferably document-containing articles, from one of a large plurality of storage compartments. Transition zones are established between adjacent accessing means for facilitating transferring articles between assigned accessing zones. Such array of storage compartments is zoned for facilitating program control of article handling. In a preferred form, magnetic recording tape is stored in small, easily transportable cartridges including ½ inch tape reels, for example, selectively accessed by two or more X-Y carriages and exchanged with one or more magnetic tape or article-processing stations. The exchange may include cartridge staging between a low-performance and a high-performance library system. Control means prevent the plurality of accessing means from interfering one with the other. The latter can be either mechanically or programmed effected.

27 Claims, 14 Drawing Figures

ARTICLE HANDLING AND DATA RETRIEVAL

DOCUMENTS INCORPORATED BY REFERENCE

Commonly assigned Badum et al. patent application Ser. No. 59,668, filed July 30, 1970, now U.S. Pat. No. 3,627,225.

Commonly assigned Kalthoff patent application Ser. No. 54,710, filed July 14, 1970, now U.S. Pat. No. 3,627,231, shows a pneumatic dispatch system for use with the present invention.

Beausoleil et al. U.S. Pat. No. 3,336,582.
Devore et al. U.S. Pat. No. 3,372,378.
King et al. U.S. Pat. No. 3,550,133.
Beach et al. U.S. Pat. No. 3,584,284.
Amdahl et al. U.S. Pat. No. 3,400,371.
Badum et al. U.S. Pat. No. 3,603,943.

BACKGROUND OF THE INVENTION

The present invention relates to storage and retrieval of articles, particularly those articles containing data representations.

Automatic document libraries have been constructed and operated, such as shown in the Burke et al. U.S. Pat. Nos. 2,941,738 and 2,941,739. These systems utilize an X-Y carriage movable along a horizontal track disposed between a pair of facing X-Y (rectangular) storage arrays. A plurality of storage compartments is replaced by access ports extending through the arrays to a tape drive unit. The library is program controllable, and the carriage is capable of fetching and storing tape cartridges in any of the storage compartments and exchanging them with either of the two tape drives illustrated in the patents.

Such libraries included open-sided rectangular arrays of storage compartments, with each compartment capable of storing one document- (magnetic tape) containing cartridge. Each compartment is selectively accessible along such open side or sides by the X-Y cartridge-positioning system. A plurality of tape handlers is disposed along the closed sides of the array and are in communicative relationship with certain ones of the array compartments for use as access ports. Other forms of library arrangements, such as those including cards, strips, and the like, have been proposed; however, the arrangement basically shown in the Burke et al patents facilitates interchange of documents between a plurality of libraries, as well as facilitating moving the documents over relatively long distances between storage compartments, processing stations, and exchanging units.

Such libraries, involving X-Y arrays of storage compartments, feature many peculiar article-handling aspects. Physical retrieval of the document-containing cartridge is identical to general article handling, whether the document is tape, cards, or other forms of magnetic media; that is, a specialized form of automatic warehousing. Such systems include position sensing and control for positioning a carriage in front of a storage compartment. The accessing means on the carriage may vary substantially from one article-handling system to another. However, the broad principles involved remain substantially constant.

Performance requirements vary between various types of article-handling systems. Generally, data-containing documents have a shorter access time requirement than other forms of article accessing. This is brought about in those situations wherein the document library is associated with automatic data processing equipment. Even for such digital-data documents, the access time requirements may vary considerable in accordance with the application of the automatic data processing equipment. For example, if the data is being processed in a sequential-batch manner, it may be desired to have a certain degree of performance in order to maximize utilization of the automatic data processing equipment. On the other hand, if the automatic data processing equipment is integrally involved with an on-line or real-time system, the time-constant constraints are dictated by the system rather than the data processing equipment. In the latter, a new set of access requirements may be imposed upon data document retrieval. While the Burke et al. patented system provides a certain degree of performance for data-bearing documents, advances in the data processing arts since that time have imposed greater performance requirements. Accordingly, new techniques over and above that disclosed by Burke et al. are desired to satisfy some present-day document retrieval requirements. Such requirements include making any document available to one of a group of data processing devices in one of a plurality of possible paths, either electronically or physically.

One aspect of enhancing performance requirements is the position-sensing and control system. Many advances in servomechanisms in the motor control area serve to enhance the performance of many article handling systems. For example, the position-sensing and control system by L. R. Beach et al. disclosed in U. S. No. 3,584,284, issued June 8, 1971, provides an X-Y positioning system capable of high performance suitable for document-retrieval systems. Even though such a system is incorporated into a library device, further enhancements are desirable.

SUMMARY OF THE INVENTION

It is an object of the present invention to provide an improved library apparatus for documents.

It is another object of the present invention to provide an article-handling system particularly for storage and retrieval of articles which facilitates transfer of articles while simultaneously enhancing total retrieval and storage performance.

Apparatus constructed in accordance with certain aspects of the present invention comprises a data retrieval system for selectively retrieving data representations from one or more of a large set of storage cells or compartments. A plurality of simultaneously and independently operable accessing means selectively retrieves or stores data representations. Physical means move among the cells for selectively accessing the contained data representations. Access control means establish zones of cells for each accessing means. The zones may overlap to establish a transition zone between each of two adjacent accessing zones. Interlock means inhibit simultaneous acces within a given transition zone by more than one accessing means. Such zones may be program determined and vary in accordance with the retrieval and storage requirements of the apparatus. While no transition zone is required to practice the present invention, a transition zone is usable for transferring data representations from one accessing means to another.

An article-handling system featuring the present invention includes an X-Y array of storage compartments preferably having accessing ports extending therethrough. A plurality of independent compartment accessing means moves along a travel path disposed on an open side of the array. Separate means exchange articles between the various accessing means and prevent interference between the several accessing means. A plurality of article-processing stations automatically exchanges articles with the accessing means. In a document system, this action includes exchanging data representations with such documents.

While mechanical barriers may prevent interference between accessing means in the transition zone, a preferred protection is programmable control means using position-sensing means for selectively and dynamically limiting travel of each accessing means. This preferred form is particularly desired for high-speed carriages. Such programming also effects dynamic control of accessing mechanisms for enhancing article handling. Such enhanced article handling may obviate need for a definable transition zone, each access or set of accesses can be independently computed in accordance with program-generated criteria.

Library operation includes queuing, not only in calling for data sets from a controlling data processing system but also in accessing and transfer of documents between article-processing stations and storage compartments and internal document transfers within the storage array or library. Document staging may be provided in a library having a plurality of accessing means. One of the accessing means may be provided as a rapid-access mechanism, while adjacent accessing means having a wider range of storage compartments selectively transfer documents between their storage compartments and a transition zone or other exchanging means to and from the high-performance accessing means. The accessing means may be interchangeable in the event of failure of any one or more of the plurality of accessing means. In this regard, a common travel path is preferred.

The invention also contemplates methods of operating data-retrieval and article-handling systems in accordance with the concepts stated above.

The foregoing and other objects, features, and advantages of the invention will be apparent from the following more particular description of preferred embodiments of the invention, as illustrated in the accompanying drawings.

DETAILED DESCRIPTION

Physically Controlled Transition Zoning

Figure 1:
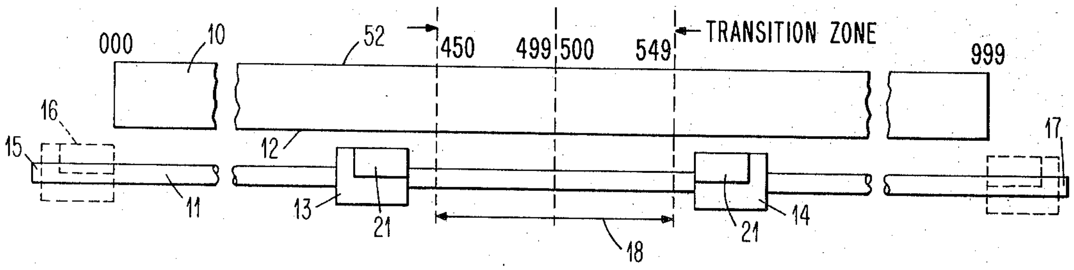
FIGS. 1 and 2 are simplified diagrammatic showings of a library system transition zone controlling apparatus constructed in accordance with the teachings of the present invention.
Figure 2:
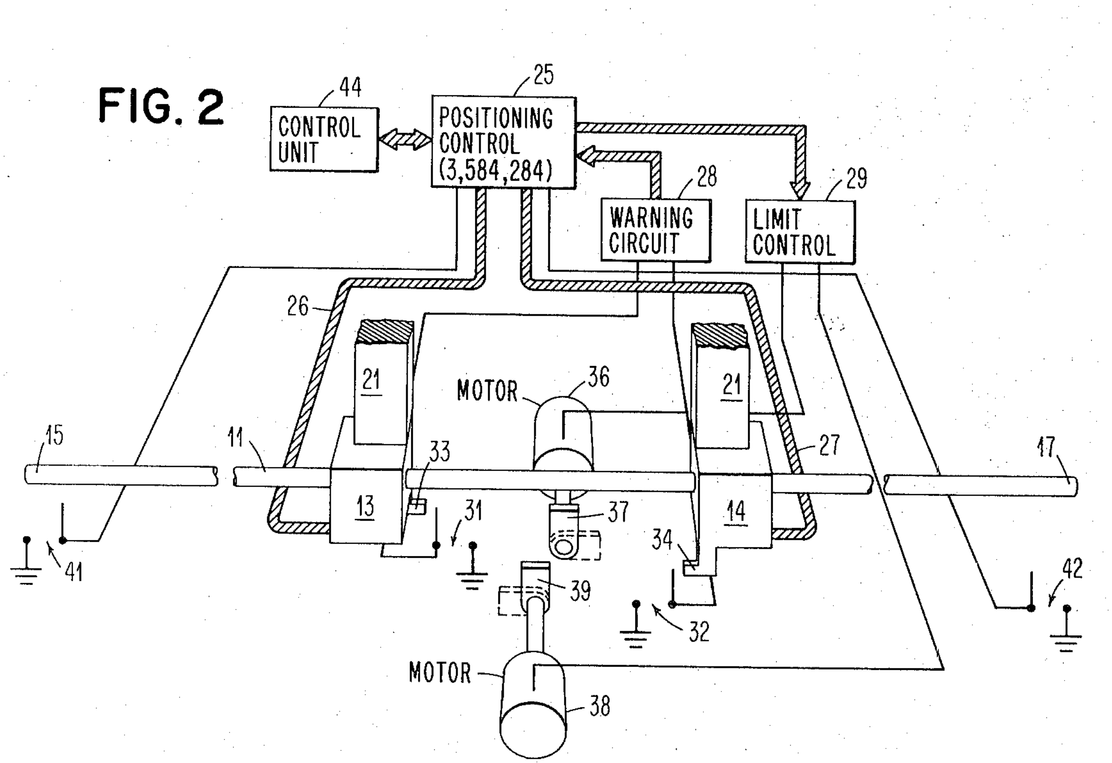

Referring to FIGS. 1 and 2, X-Y or rectangular array 10 of a large plurality of storage compartments, such as those shown in the Burke et al. U.S. Pat. No. 2,941,739, have X addresses 000 at the left-hand end portion through 999 at the extreme right-hand end portion. Additionally, Y or vertical dimension addresses are provided (not shown). For purposes of simplicity, only X dimension accessing is described in detail. Array 10 has open side 12 permitting access to any of its storage compartments for storage or retrieval of articles or article-containing cartridges. The storage compartments are selectively accessed by a pair of X-Y carriages 13 and 14 movable along a common travel path or rail 11 disposed at least coextensively with array 10. By appropriate control, as will become apparent, either carriage 13 or 14 may access any of the storage compartments; however, carriage 13 (FIG. 1) primarily accesses the storage compartments associated with X addresses 000 through 499, while carriage 14 primarily accesses those storage compartments associated with X addresses 500 through 999. In the event of failure of one of the carriages, two parking areas 15 and 17 at opposite ends of travel path 11 are provided. Carriage 13 may be parked in area 15 as indicated by dash line 16. In a similar manner, carriage 14 may be parked in area 17 for permitting carriage 13 to access those storage compartments associated with X addresses to 999.

In a document-handling system associated with automatic data processing equipment (as will be later more fully described), transition zone 18 facilitates exchange of document-containing cartridges between the compartments primarily accessed by carriages 13 and 14. For example, X addresses 450 through 549 are defined as transition zone 18. While carriage 13 primarily accesses those storage compartments identified by X addresses 450 through 499, carriage 14 may selectively access those compartments provided carriage 13 is not within zone 18. In a similar manner, carriage 13 can access those storage compartments associated with X addresses 500 through 549 provided carriage 14 is not simultaneously accessing same.

Each carriage 13 and 14 has an elevator system 21 for accessing compartments in a plurality of horizontal rows of such storage compartments. Such elevator mechanism may be like that shown in the Burke et al patents or in the Beach et al patent, supra. Elevators 21 are conveniently located at the facing position of the carriages such that both carriages can access compartments in their respective portions of the transition zone 18 simultaneously. However, because of physical constraints for small articles, carriages 13 and 14 may not simultaneously access X addresses 499 and 500.

Referring now more particularly to FIG. 2, controlling carriages 13 and 14 with respect to transition zone 18 is described in accordance with a first aspect of practicing the present invention. Positioning control 25, inter alia, may be constructed in accordance with the teachings in the Beach et al. patent, supra. Additionally, all logic which can be readily designed in accordance with the functions hereinafter set forth may be included. Flexible cables 26 and 27 connect carriages 13 and 14 to positioning control 25. Control unit (U.S. Pat. No. 3,400,371) supplies MOVE commands to positioning control 25 for each of the carriages and elevators. Positioning control 25 supplies address signals associated with such MOVE commands to limit control 29. Whenever limit control 29 detects an address in zone 18, it actuates motors 36 or 38 to move carriage barriers 37 and 39 to prevent carriage 13 or 14 from crossing the center line at 499–500. Limit control 29, a shaft position control, responds to switches 31 or 34 to position stop 39 in a known manner. Limit control 29 may be actuated as described by Beach et al., supra. Otherwise, for example, Apgar et al. U.S. Pat. No. 2,907,937 may be used to position stop 39. Input to the control binary counter of Apgar et al. can be from switches 31 or 34 via positioning control 25 to preset such counter to values corresponding to the three positions of stop 39. Control 29 may also be a stepping motor controlled as set forth in Agin et al. U.S. Pat. No. 3,541,418 wherein a predetermined counter (not shown) is actuated by switches 31 or 34 to step the motor a given number of times to position stop 39 in its three positions. Other U.S. Pats. showing shaft positioning sensing and congrol include Harper, No. 3,505,950, Hoernes et al., No. 3,469,257, Baskin et al., No. 3,461,449, Thompson, No. 3,458,786, Tibbling, No. 2,879,877, Caldwell, No. 2,788,519, McAuslan et al., No. 2,944,157, Knox, No. 3,046,541, Steele, No. 2,733,431, Lorendahl, No. 3,475,983, and Walton, No. 2,872,671. In summary, any shaft position control or limiter may be employed. Alternatively, limit control 29 may include known digital address comparison circuits, one input for each comparison being the defined limit of address and the other form position control 25 indicating carriage location. For the FIG. 1 embodiment, there would be a comparison circuit for each of the addresses 000, 450, 499, 500, 549, and 999. These comparison circuits could supplement sensing switches 41, 31, 34, and 42. Additionally, control unit 44 has programmed limit means for limiting the travel. The mechanical barriers are a safety feature to prevent the carriages 13 and 14 from colliding in the event programmed control does not properly command the moves.

The system also detects presence of carriage 13 or 14 in zone 18. Sensing switches 31 and 32 are disposed immediately adjacent travel path 11 and supply ground reference potential to warning circuit 28 whenever a carriage is within transition zone 18. Whenever carriage 13 is in transition zone 18, depending arm 33 closes sensing switch 31. Ground reference potential is then supplied via warning circuit 28 creating a corresponding program threshold in positioning control 25. Similarly, carriage 14 has depending arm 34 for closing switch 32. In response to closed switch 31, positioning control 25 instructs limit control 29 to actuate motor 36 for pivoting mechanical barrier 37 into carriage-blocking relationship to carriage 14. In this situation, a depending arm (not shown) on carriage 14 prevents the carriages from entering that portion of transition zone 18 from address 500 through 450. In a similar manner, when switch 32 is closed, limit control 29 actuates motor 38 moving mechanical barrier 39 into blocking relationship to carriage 13. This prevents carriage 13 from accessing any storage compartment associated with X addresses 499 through 549.

Additionally, park area sensing switches 41 and 42 respectively inform position control 25 that barriers 37 and 39 are not to be actuated. For example, carriage 13, being parked in area 15, closes switch 42. Position control 25 responds by never moving barriers 37 and 39. This action freely permits carriage 14 to access all of the storage compartments within array 10, and vice versa.

Warning circuit 28, when sensing both switches 31 and 32 being closed, supplies an alarm signal to position control 25. Position control 25 pays immediate attention to such warning signal by sensing the relative velocities and directions of carriages 13 and 14 in accordance with the signals supplied over cables 26 and 27. If the velocities are high and it appears that carriages 13 and 14 may collide, positioning control 25 immediately causes the carriages 13 and 14 to reverse for preventing the collision. The latter is an emergency procedure preferably designed within positioning control 25 or control unit 44.

Figure 3:
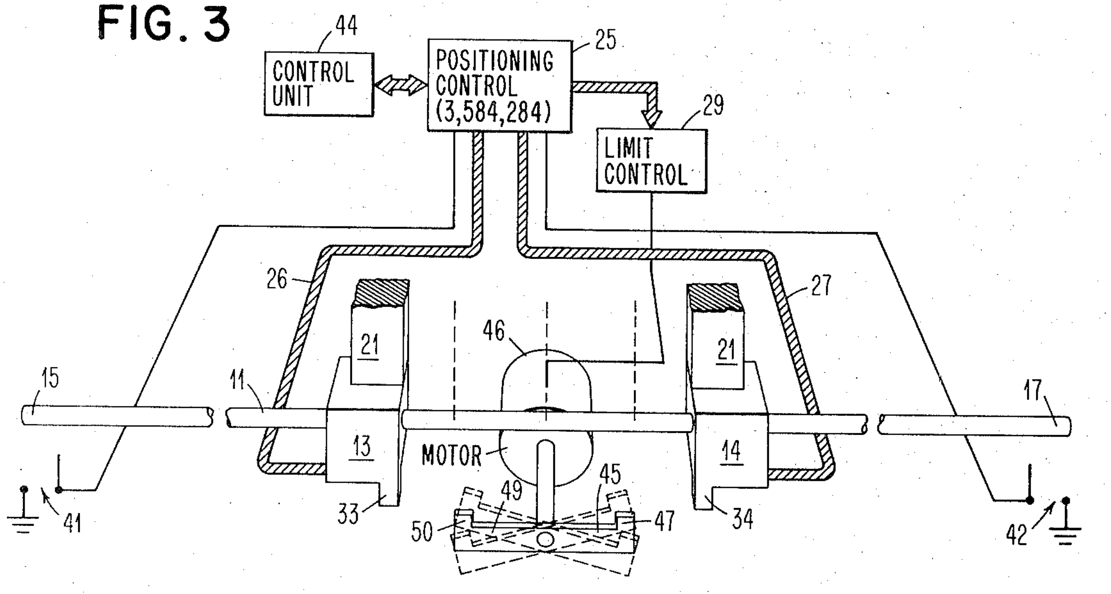
FIG. 3 is a simplified diagrammatic showing of a second version of the FIGS. 1 and 2 illustrated apparatus.

Referring next to FIG. 3, an alternate or supplementary physical barrier system is described. The barriers are selectively positioned to stop the carriages respectively at X addresses 450 and 549. Limit control 29 actuates positioning motor 46 to pivot mechanical barrier 45 to one of three positions. The first position, shown in the solid lines, has right-hand upstanding barrier 47 preventing either carriage 13 or 14 from passing X address 549. This position allows carriage 13 to access any of the compartments witin transition zone 18 while preventing access by carriage 14. When barrier 45 is used as a supplementary barrier to 37 and 39 of FIG. 2, it enables carriage 13 to access those compartments associated with addresses 500 through 549. When used as a supplementary barrier, barrier 45 is normally in a horizontal position permitting both carriages 13 and 14 to pass thereover, with barriers 37 and 39 preventing collisions.

On the other hand, when it is desired to have carriage 14 access a compartment within zones 450 through 499, barrier 45 is moved to the dotted line 49 position wherein the left-hand upstanding barrier 50 prevents carriage 13 from passing address 450 while simultaneously permitting carriage 14 to access compartments within the left-hand portion of transition zone 18. Either switch 41 or 42 being closed in the parking zones 15 and 17, respectively, forces limit control 29 to position barrier 45 in the horizontal position.

The above-described compartment arrays having dual X-Y carriage accessing are particularly useful in high-performance automatic document storage retrieval systems. Such documents may be a short length of magnetic media contained in a relatively small media-containing cartridge such as the cartridge described in the Badum et al patent application, Ser. No. 59,668, filed July 30, 1970, supra. In the Badum et al. patent, the FIG. 1 illustrates article-processing machine or tape handler receives the media-containing cartridge shown in the Badum et al. FIG. 3 via cartridge transfer means from an array of work stations or storage compartments shown in the Beach et al. patent, supra. The Badum et al. apparatus may be disposed along closed side 52 of array 10 with pneumatic tubes or the like extending through the array to the open side 12. Open ends of such tubes are accessible by either of the carriages 13 or 14 in the same manner as a storage compartment. A plurality of such media-handling stations may be disposed along array 10. The present invention also finds good utility for handling one-half inch tape volumes presently used in digital magnetic tape record systems.

Annular X-Y Storage Array

Figure 4:
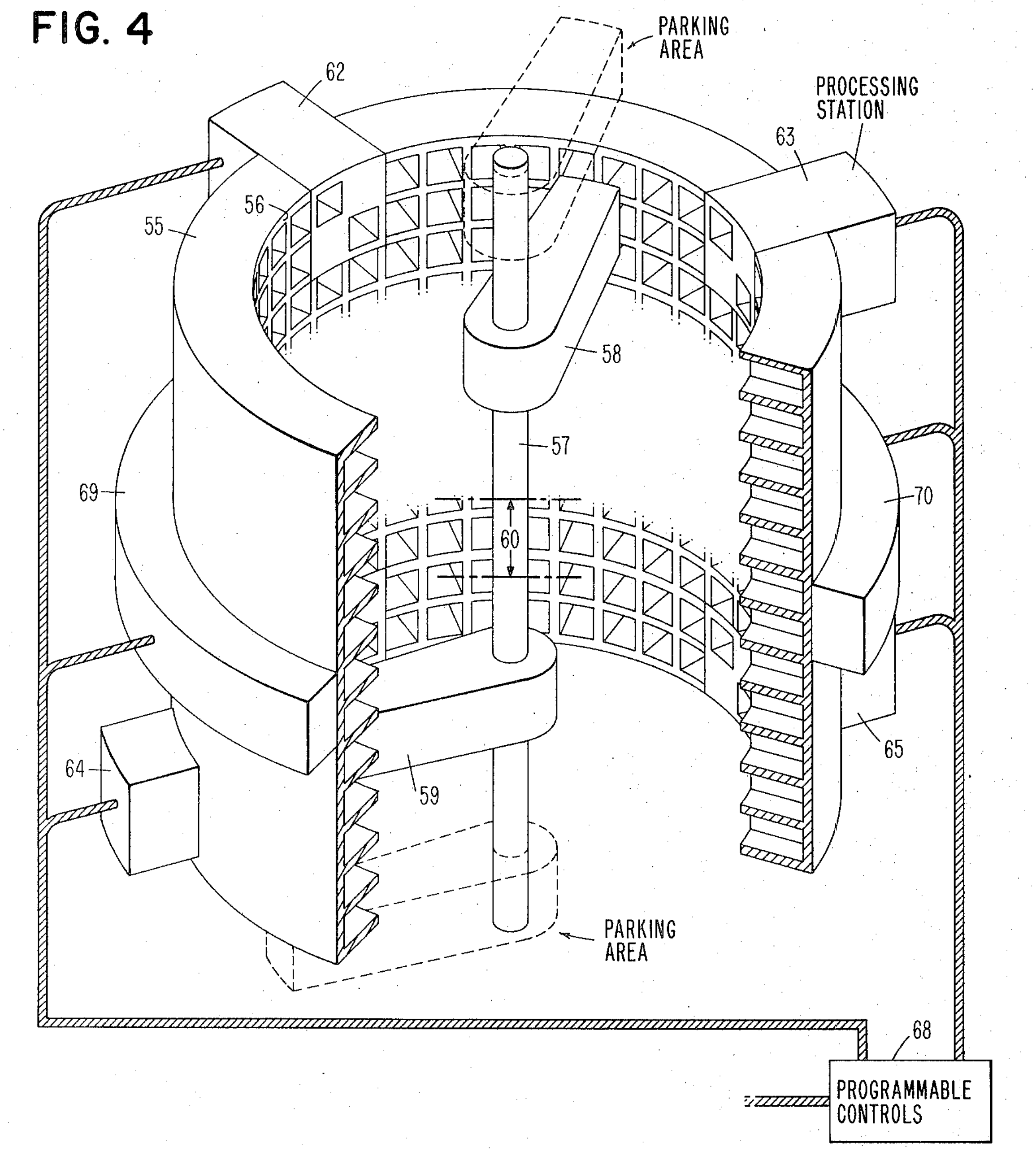
FIG. 4 is a simplified diagrammatic showing of an annular X-Y array library system incorporating the teachings of the present invention.

The present invention also contemplates different geometric configurations of storage arrays. An additional one is shown in simplified diagrammatic form in FIG. 4 with the Badum et al. cartridge usable with that geometric configuration in the same manner as the linear configuration shown in FIG. 1. In FIG. 4, annular array 55 of storage compartments with inner open side 56 has a common axially extending rail or travel path 57. A pair of X-Y carriages 58 and 59, movably supported on rail 57 for axial (X) and rotational (Y) movements, selectively access storage compartments in array 55. Transition zone 60 may be established at the axial center of array 55. Carriage 58 accesses the upper-half addresses of storage compartments and is operatively associated with a pair of article-processing or document-processing stations 62 and 63. In a similar manner, carriage 59 accesses storage compartments in the lower half of array 55 and is operatively associated with a pair of processing stations 64 and 65. Carriages 58 and 59 are operatively controlled by control 68 via flexible cables (not shown). Sensing means 69, 70 along transition zone 60 operate in the same manner as switches 31 and 32 in FIG. 1. Means 69, 70 have either optical or sensors (not shown) extending through array 55. A light beam directed adjacent path 57 is interrupted by the carriages when in zone 60. The axial movements of carriages 58 and 59 can be restricted mechanically as described for FIGS. 1–3 or be program controlled.

The operation and control of carriages 58 and 59, whether in annular array 55 or in a linear array, follow the same principles. The address limiting, zoning, and dynamic control of such library arrangements can be the same via the use of programmable controls 68 (Amdahl, supra). Advantages of annular array 55 are space limitations and enabling a large number of processing stations for a given number of storage compartments. Processing stations 62–65 need not be of the vacuum column type (Badum et al, supra), but may be card readers for card-type documents, reel-to-reel type of magnetic-media transports, strip readers for flexible strip documents, receiving stations facilitating manual operations, and the like.

Through the use of suitable exchange mechanisms, one of the processing stations may exchange document-containing articles with a larger library array, such as that shown in FIGS. 1–3 and as will be later explained with respect to multiple library arrangements.

Rectangular Arrays With Three Carriages

More than two accessing means or carriages can be provided for a given travel path. For example, in FIG. 5, three storage arrays 75, 76, and 77 are respectively serviced by accessing means X1, Xz, and X3 along common travel path 78. Normally, the respective accessing means service only one of the three arrays with cartridge transfer between the arrays effected by automatically controlled pneumatically dispatched full-duplex (bidirectional) transfer systems 80, 81, and 82 diagrammatically shown as tubes extending between the respective arrays. Construction of pneumatic dispatch systems capable of automatically handling document-containing articles is well known. It is preferred that the article orientation with respect to the storage array be maintained.

For transferring an article from array 75 to array 77, X1 inserts a fetched article into the left end portion of system 82; system 82 automatically transfers same to array 77; X3 fetches the article and either stores it in a compartment for later use or delivers it to a processing station. Transfers between any of the arrays 75–77 follow similar procedures. A programmable controller effects control of air flow in such pneumatic dispatch systems for making the transfer of the document-containing article between the various arrays on a fully automatic basis. Additionally, accessing means X1, X2, and X3 have parking areas 85 at the left-hand extreme end of the travel path, at 86 intermediate arrays 75 and 76, at 87 intermediate arrays 76 and 77, and at 88 at the extreme far right-hand end portion. For example, accessing means X2 may be parked either at 86 or 87 depending upon the data retrieval and storing activities of arrays 75 and 77. In this manner, either X1 or X3 may access array 76 whenever X2 is not operating. Parking areas 85 and 88 preferably are large enough to accommodate two accessing means such that the end accessing means X1 or X3 can access any of the storage compartments within the three arrays. Additionally, a spare accessing mechanism may be parked in one of the two end parking areas.

Gravity-Actuated Article Exchange

Figure 5:
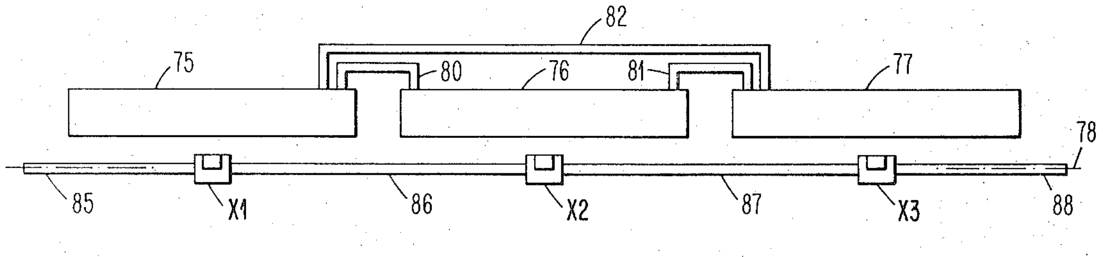
FIG. 5 is a simplified diagrammatic plan view of a library having three independent accessing means with interchange means wherein any of the accessing means may service all three portions of the library.
Figure 6:
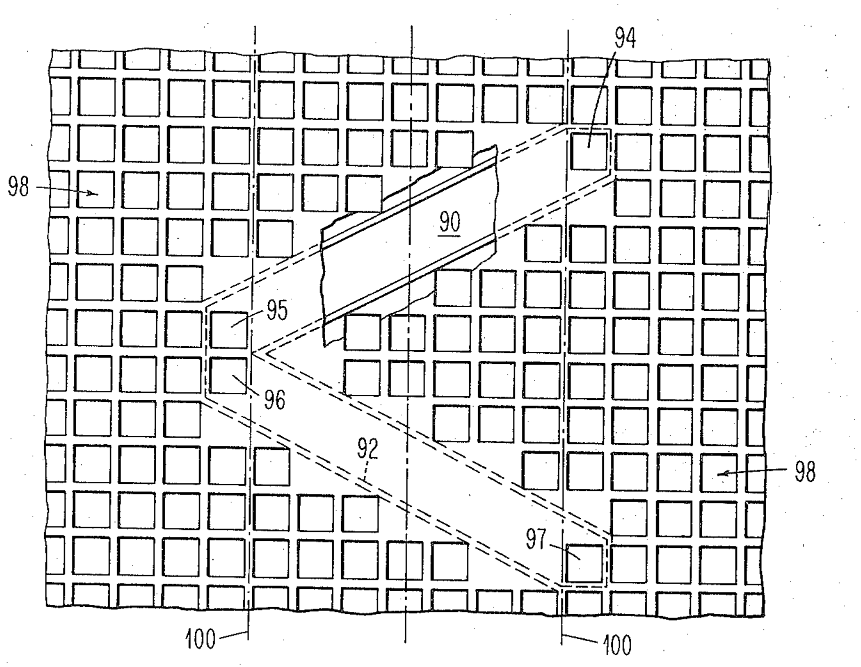
FIG. 6 diagrammatically illustrates a gravity actuated article-exchanging unit.

In addition to the pneumatic transfer means shown in FIG. 5, a gravity transfer may be effected between compartment array zones for exchanging articles or cartridges between independently operable accessing means. Such cartridge exchanging may be either within a continuous array or between adjacent physically separated arrays having a common travel path. As shown in FIG. 6, a pair of cartridge transfer tubes 90 and 92 respectively exchange cartridges from right to left and left to right. Dotted line 93 denotes the boundary between a pair of adjacent accessing means (not shown). To exchange a cartridge, the accessing means on the right-hand portion deposits a cartridge in the upper end of tube 90, at 94. As soon as the accessing means releases the cartridge, it slides downwardly to receiving end 95. The left-hand accessing means (not shown) retrieves the cartridge from 95 and stores it at a storage compartment on the left-hand portion or transfers same to a processing station.

Cartridges can be queued in tube 90; for example, the right-hand accessing means may store a succession of cartridges (for example, five) which are queued for access within tube 90.

In the same manner, to transfer a cartridge from left to right, the left-hand accessing means deposits a cartridge at receiving portion 96 of tube 92. The inserted cartridge slides down tube 92 to exit 97 whereupon it can be accessed by the right-hand accessing means. Tubes 90 and 92 may be fitted in among a plurality of storage compartments indicated by cross-hatchings 98. When so situated, the tubes 90 and 92 may extend across the transition zone indicated by the parallel dashed lines 100. Access to the storage compartments within the transition zone is in accordance with the teachings of FIGS. 1–3 or may be program controlled and limited, as will be later described. Tubes 90 and 92 then facilitate transfer between the accessing means without the requirement of interlocking the operation within transition zone 100. Of course, the tubes may be located within the transition zone with the storage compartments indicated by cross-hatching 98 and accessible by the two accessing means as regular storage compartments with all data exchanging being provided through the tubes 90 and 92 for facilitating queuing and programming control of document exchange.

For example, in a multiple accessing library system, each independent accessing means may be assigned a particular number of data sets. It may be desired that each accessing means provides access to these data sets for assigned data processing equipment which may be operating independently. Because of varying workloads and different processing requirements, it may be desired to transfer a data set from one accessing means, hence, one data processing equipment to another. A data set may comprise, for example, ten document-containing cartridges. In exchanging such data set, it may be desirable to queue all 10 cartridges within one of the tubes 90 or 92 such that the accessing means may sequence all of the cartridges in one set of moves for minimizing programming problems in the associated data processing equipment. In other words, such queuing simplifies programming requirements for maximizing efficiency of an entire data processing system or systems incorporating a complex automatic library as described in this specification.

Presently Preferred Multiple-Access Library

Figure 7:
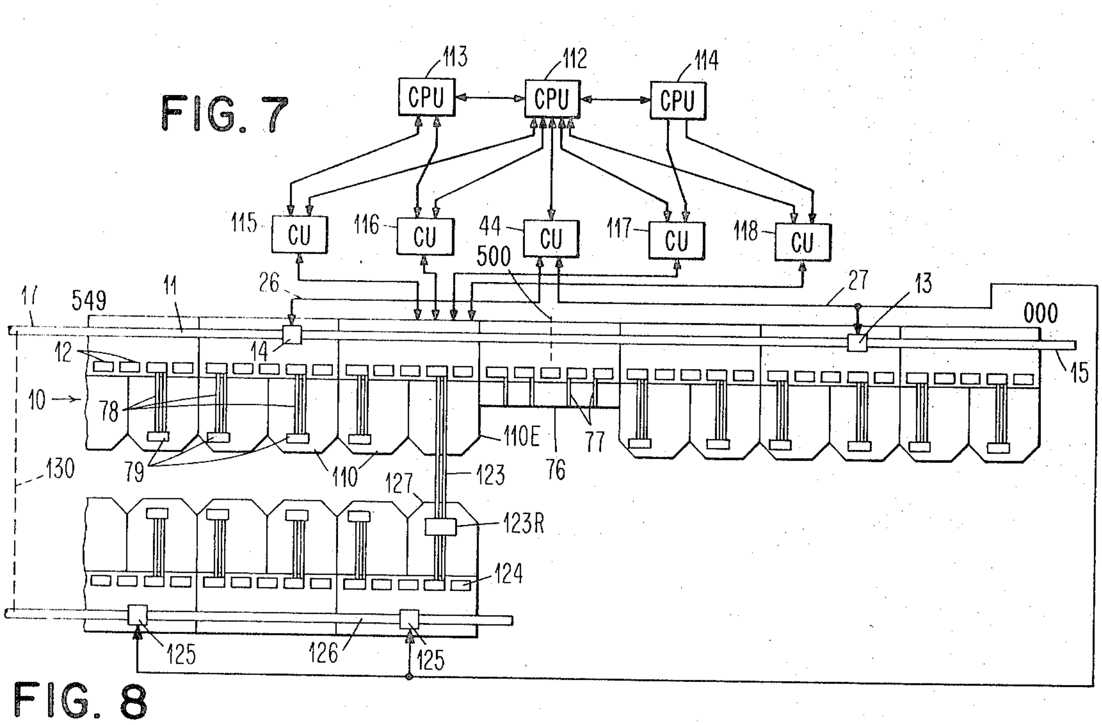
FIGS. 7, 8, and 9 diagrammatically illustrate a preferred apparatus constructed in accordance with the present invention. A hierarchal pair of document libraries is illustrated.
Figure 8:
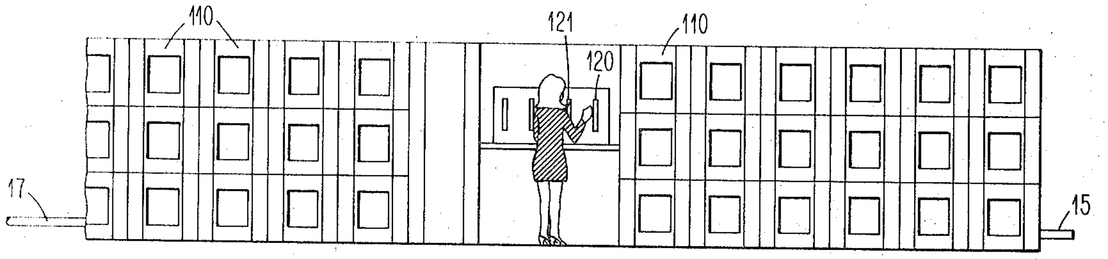
Figure 9:
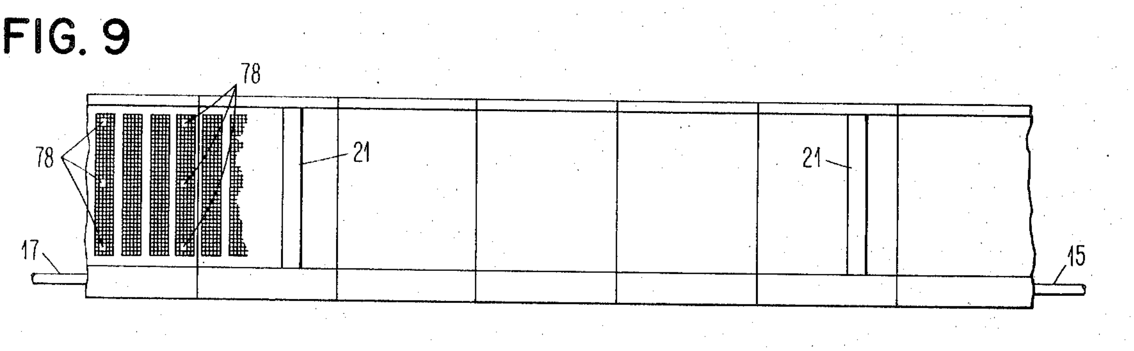

Referring next to FIGS. 7, 8, and 9, a presently preferred form of the present invention is described. Any of the previously described mechanisms for effecting a plurality of access means operation may be used in the illustrated document-retrieval system of FIGS. 7, 8, and 9. X-Y storage compartment array 10 consists of a plurality of subarrays, each individually mounted within one of a plurality of electronic-type cabinets 75. A single track 11 extends coextensively with the electronic cabinets. In the center of the library, manual entry station 76 occupies one cabinet. Array 10 extends across manual entry station 76 with a plurality of entry posts 77 extending through array 10 to facilitate exchanging cartridges between the storage compartments and a manually operated library or to other locations, as may be desired. Such manual entry may be effected by a magazine of a plurality of document-containing cartridges. For example, eight such cartridges may be carried in one magazine with gravity moving the cartridges to a dispensing portion of the magazine. Suitable interlocks may be provided at the manual entry station to ensure that once the magazine is inserted into the machine, it cannot be removed without an electronic signal received from a controlling data processing system. Also, the magazines, for data security reasons, may be interlocked such that the operator off the library does not have access to the individual cartridges; and the manual entry station unlocks the magazine for retrieving the contained cartridges and inserting same into a library. Other forms of magazines may be used. For example, an 8×8 storage compartment modular array pluggable into the library and accessed as any permanent storage compartment may be used.

In many data processing centers, a main data bank library with a librarian protects the data base of the processing center. When spools of tape or other documents are transferred to a machine for machine operations, an operator receives the document from the librarian and inserts it into the machine. In this instance, through the use of magazines of various types and interlocks, no operator has direct access to any data contained in the data base of a given data processing center. The automatic document-retrieval system facilitates data security in these regards. The design of such a magazine and insertion into a manual entry station and the interlocking systems are not necessary for the understanding of the present invention and are not further described for that reason. On the other hand, individual cartridges could be inserted into a manual entry station and the invention successfully practiced to its fullest degree.

The illustrated library system has a large plurality of article-processing stations such as magnetic media handlers 110 disposed coextensively with array 10. Magnetic media handlers 110 operable with document-containing cartridges are well known and are not further described. Pneumatic dispatch systems 78 extend respectively between the open side 12 of array 10 immediately adjacent each of the handlers to a cartridge-handling mechanism 79 in each of the respective article-processing stations 110. Each pneumatic dispatch system 78 includes an incoming tube for transferring cartridges from array 10 to cartridge-handling mechanism 79 and an outgoing tube for transferring cartridges from mechanism 79 to array 10. The array 10 terminal portions of these pneumatic dispatch tubes have the same configuration as storage compartments. Suitable detenting is provided for releasably retaining the cartridges in a precise position in each of the storage compartments and array terminal portions.

Multiple Accessing Operations

A typical operation using the present invention in the embodiment illustrated in FIGS. 7, 8, and 9 will include a large set of cartridges stored within array 10. For example, 10,000 or more cartridges may be so stored. Selected compartments may be left vacant for receiving additional cartridges insertable through manual entry station 76. Positioning control 25 of FIGS. 1, 2, and 3 is located in electronic module 110E. Control unit 44 is programmable. A controlling CPU or computer 112 supplies MOVE commands to CU 44. Either CPU 112 or CU 44 may queue moves. U.S. Pat. Nos. 3,445,819, Re. 26,087, and 3,566,363 illustrate multicomputer operations and construction. CU 44 issues MOVE instructions over flexible cables 26 and 27 to carriages 13 and 14 for X-Y moves. The carriages respond to the instructions for fetching document-containing cartridges from the addressed compartments in X-Y array 10 and supplying same to the designated pneumatic dispatch system 78. These pneumatic dispatch systems 78 respond automatically to insertion of a cartridge for transferring it to cartridge-handling mechanism 79 as described by Kalthoff, supra. Mechanism 79 may be computer controlled or may be automatically responsive to the receipt of a cartridge for transferring it from a loading position to an operating position in the respective media handler 110. When mechanism 79 puts an article into the output tube of a system 78, it generates a status signal as described by Kalthoff, supra. This status signal is supplied to CU 44 as a request to fetch the article. CU 44 either queues the request or supplies it to CPU 112 for queuing the requested fetch. Simultaneously, CU 44 notes that the article handler is available and is placed in that queue in CPU 112.

The MOVE commands received from CPU 112 are at a relatively low rate with respect to the transfer of data signals between respective media handlers 110 and CPU's 113, 114. Accordingly, the type of channel extending between CPU 112 and CU 44 may be of the multiplex type wherein a large plurality of peripheral devices communicates with CPU 112. In order to handle a large nuber of data processing operations performable by the large plurality of media handlers 110, as best seen in FIG. 8, four other control units 115 through 118 (see Irwin U.S. Pat. No. 3,654,617, for example) selectively control the various media handlers 110. The arrangement between CU's 115–118 and the media handlers 110 may be in accordance with the switching system described in Devore et al U.S. Pat. No. 3,372,378. CPU 112 program coordinates the actions of the various CU's, media handlers, and CPU's 113 and 114. In a system arrangement, CPU's 113 and 114 may be primarily adapted for providing data processing operations with respect to data recordable on documents stored within array 10. CPU 112 communicates with the other CPU's 113 and 114 for coordinating X-Y moves such that the appropriate document-containing cartridge can be at an assigned media handler 110 at the appropriate time. CPU 112 also establishes queues of various cartridges to the respective handlers and availability of handlers and accessing mechanisms.

For example, CPU 113 may require fifteen cartridges in connection with a certain data processing operation. These cartridges may be in one array area or may be dispersed. For example, seven of the cartridges could be accessible by carriage 13, while eight would be accessible by carriage 14. CPU 112 responds to a request from CPU 113 to locate the cartridges, i.e., identify the storage compartments in which they reside. CPU 112 then programs the moves and assigns media handlers to receive the cartridges for processing the data signals with respect to such documents. CPU 113 is then assigned those media handlers which receive the document-containing cartridges. CPU 112 informs CPU 113 which media handlers are assigned to it for that particular data processing operation. CPU 113 then responds to this information to select appropriate CU's which then select the designated media handlers using techniques shown in U.S. Pat. Nos. 3,336,582 and 3,550,,133. Once the media handlers have received the cartridges and have been selected by CPU 113, the CU's which responded to CPU 113 effect transfer of data signals between the media handlers, and hence the documents, and the CPU 113. Note that accessing cartridges from the storage compartments for transfer to the media handlers is simultaneous. CPU 114 data processing operations and exchanging of data signals with documents in array 10 are handled in a similar manner.

Additionally, automatic insertion of document-containing cartridges into the library from manual entry station 76 is handled in a similar manner. CU 44 receives document-identifying information from the manual entry station via a keyboard. CU 44 then informs CPU 112 that such cartridge is available. CPU 112 then assigns a storage compartment for that cartridge and effects transfer of the cartridge from manual entry station 76 to the designated storage compartment. Alternatively, transfer may be immediately to a media-processing station 110. Manual entry station 76 may also include a display indicating to an operator which cartridges are being deposited for removal to a storage area.

Manual entry station 76 has four exchange ports 77, two being associated with the respective X-Y carriages 13 and 14. One magazine-receiving station 120 is an input port, and a second magazine-receiving station 121 is an output port for carriage 13. Two similar ports are provided for carriage 14.

Referring more particularly to FIG. 9, the open-face side of array 10 is best seen. Each dot represents, without limitation, a storage compartment roughly 2 inches square and 4 inches deep. Pneumatic dispatch systems 78 require space for nine of such storage compartments. While the terminal portions have the same size as the storage compartments, additional mechanical portions such as detents, actuators, sensors, and the like require the additional space. The ports associated with pneumatic dispatch terminal of system 78 are evenly distributed along the library array 10 in accordance with the spatial requirements of the processing stations.

CPU 112 has programs associating cartridges stored in the array 10 with predetermined dispatch systems 78 such that travel by the carriages 13 and 14 is minimized. In view of the fact that travel in the longitudinal or X direction of array 10 requires most power and the most time, most linear programming in CPU 112 may be directed to this dimension. Such minimum motion algorithms have been often referred to as the "traveling salesman" programs. Exemplary approaches to such programming are shown in the following listed references:

1. *Operations Research: Methods and Problems;* by M. Sasieni et al.; "The Assignment Problem," pages 185–188, inclusive; and "The Traveling Salesman Problem," pages 264–269, inclusive; N.Y., Wiley 1959.

2. *Linear Programming*, by S. I. Gass, "The Transportation Problem," pages 152–156, inclusive, McGraw-Hill, 1958.

3. IBM TECHNICAL DISCLOSURE BULLETIN, Volume 13, No. 9, February 1971, pages 2499–2500, "Algorithm for Solving the Traveling-Salesman and Other Problems," by M. Held and R. M. Karp.

4. *IEEE Transactions on Information Theory*, Vol. IT–17, No. 1, January 1971, "The Source Coding Game," by Toby Berger, pages 71–85, inclusive.

Other techniques may be used to practice the invention to advantage.

FIGS. 7, 8, and 9 show a single X-Y array accessible by two independently operated carriages as described with respect to FIGS. 1 et seq. It is also possible to use the invention in a cartridge-staging environment wherein a hierarchy of libraries is interconnected with the cartridges being staged to a rapid access library and being automatically exchangeable between a plurality of X-Y arrays. As simply shown in FIG. 7 only, elongated pneumatic dispatch system 123 extend from X-Y array 10 to a second X-Y array 124. To maintain relative orientation of articles in both libraries, article reversing means 123R is interposed in dispatch system 123. This reversal means take any one of several configurations. A mechanical turntable or a Y set of reversing pneumatic tubes similar to those techniques used in railroads may be employed.

Second X-Y array 124 is serviced by a plurality of carriages 125 movable along common travel path 126 on open side of array 124. A plurality of media-processing stations 127 may be provided facing the media-processing stations 110. Additionally, media-processing stations 127 may be controlled by CU's 115–118 or in the alternative by another data processing system (not shown). Then, pneumatic dispatch system 123 provides a communication relationship between two data processing systems.

Further, as indicated by dotted line 130, the carriages on travel path 11 may be interchanged with carriages on travel path 126. Such exchange may be manual, or an additional carriage (not shown) can be provided for moving the carriage 14 from travel path 11 to travel path 126, details of which are not important to the practice of the present invention.

A Facing Array Embodiment

Figure 10:
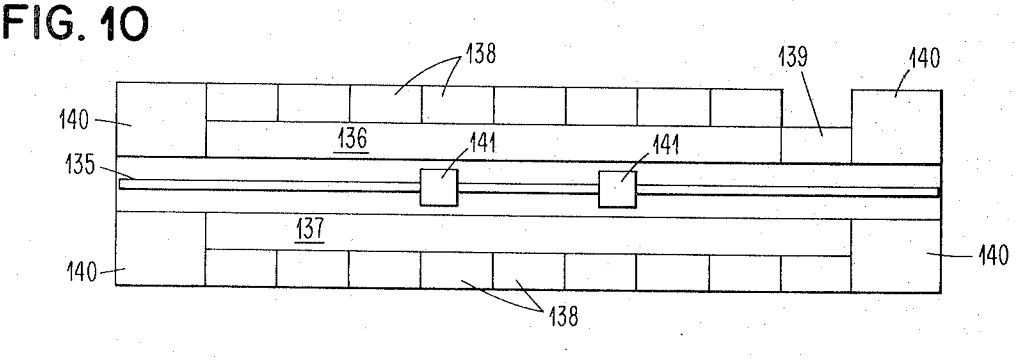
FIG. 10 is a simplified diagrammatic plan view of a document library system constructed in accordance with the teachings of the present invention wherein facing compartment storage arrays are used.

Referring next to FIG. 10, a simplified diagrammatic plan view of a library system jointly incorporating the teachings of the Burke et al. patents and the present invention is shown. Common travel path or rail 135 extends along a pair of facing open-sided arrays 136 and 137. A parking area is provided at each end portion of rail 135. A plurality of outwardly facing media handlers 138 is disposed along both arrays. Pneumatic dispatch tubes, as shown in FIG. 7, extend from the handlers 138 to the open side of arrays 136 and 137. Manual entry station 139 is provided at one end of array 136. Electronic modules 140, which may be control units, are disposed at the four corners of the array for covering the parking areas from view. A pair of X-Y carriages 141 are movable along rail 135 as described for FIGS. 1 et seq. Carriages 141 include cartridge-accessiing mechanisms on an elevator capable of accessing cartridges or storing cartridges in either of the arrays 136 or 137. This can be provided either by reversing the accessing mechanism or by providing two independent accessing mechanisms. Alternately, two rails may be provided instead of one, with each carriage on a different rail. Since bypassing is difficult, the same rules apply to the two-rail system as would apply to the single-rail system.

In a hierarchal library system, the FIG. 7 illustrated library could be a large storage library connectable via pneumatic dispatch means to a library such as shown in FIG. 10. The reduced access time, because of the geometric configuration of FIG. 10, can be used as a cartridge-staging mechanism for use in real-time or other data processing systems.

Duplex Cartridge Exchange

Figure 11:
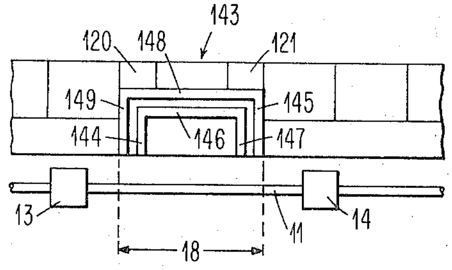
FIG. 11 is a simplified diagrammatic showing of an article-exchanging system between two adjacent accessing means.

FIG. 11 diagrammatically illustrates in simplified plan view a cartridge-exchanging system usable with the FIG. 7 or 10 illustrated embodiment. Rail 11 extends beyond transition zone 18 across which cartridge-exchanging pneumatic system 143 extends. Carriages 13 and 14 respectively can simultaneously access pneumatic dispatch input ports 144 and 145. When carriage 13 deposits a cartridge in port 144, a pneumatic dispatch system (not further described), including tube 146, moves the cartridge to output port 147 whereupon carriage 14 accesses the cartridge for transferring it to a media handler or storage compartment. For transferring cartridges from carriage 14 to carriage 13, input port 145 receives a cartridge, transfers same to tube 148, and then output port 149. To complete the exchange, carriage 13 accesses output port 149. The space in transition zone 18 may include a manual entry station in conjunction with pneumatic transfer system 143. In this regard, an input magazine station 120 supplies magazines or cartridges to an output port (not shown) beneath input port 149. Similarly, output magazine station 1211 receives cartridges from an input port (not shown) below output port 145. In a similar manner, through known pneumatic switching, magazine station 121 may receive cartridges from carriage 14 via port 145. Pneumatic dispatch system 143 may be constructed in order to queue cartridges therein such that the operation of the total library with respect to a data processing system is not delayed.

The exchanging system shown in FIGS. 6 and 11 may be favorably compared with regard to performances. The FIG. 6 embodiment is less expensive and a bit slower than a pneumatic dispatch system. The FIG. 6 embodiment may also be constructed in connection with a manual entry station wherein input port 94 may also receive cartridges from an input magazine station. Accordingly, in practicing the present inventin, a manual entry station and exchanging of cartridges between zones of operation of independently operable accessing means provide low-cost flexibility in such a system.

Abbreviated Example of Multiple Accessing

Figure 12:
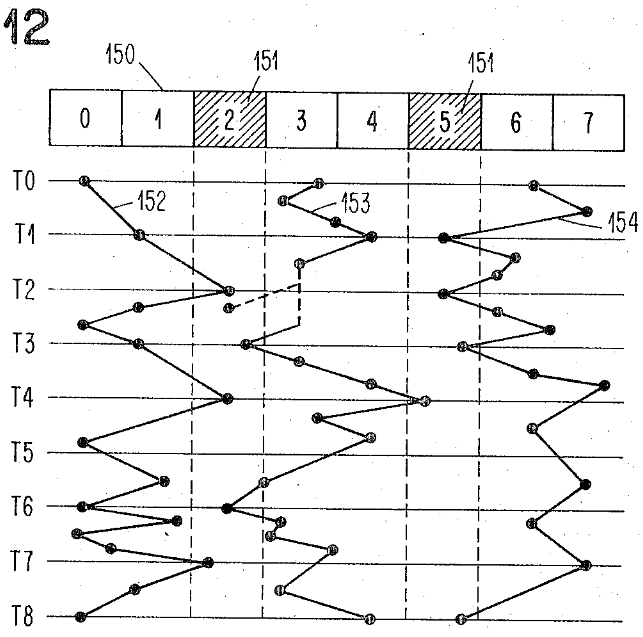
FIG. 12 is a diagrammatic showing of a zoned library and movements of three accessing means over nine time quanta.

One method of computer-controlled operation of a plurality of accessing means having a common travel path is briefly explained with respect to FIG. 12. At the top of the figure, box 150 represents a library system such as shown in FIG. 7. The hatched areas 151 represent transition zones between zones of operation of three independent X-Y accessing means. The library array is divided into eight zones, 0–7. The first accessing means exclusively services zones 0 and 1 and shares zone 2 with a second accessing means. The second accessing means exclusively services zones 3 and 4, while sharing transition zones 2 and 5 with the other two accessing means. A third accessing means exclusively services zones 6 and 7 and is also operable in transition zone 5.

By arbitrary definition, any of the accessing means can enter a transition zone 2 or 5 only at certain times denoted T0–T8 in FIG. 12. At intermediate points, the zone is forbidden. The solid line 152 represents the operation of a first accessing means with dots indicating access to a storage compartment or a pneumatic dispatch system terminal. The pitch of the line has no relationship to the velocity of the accessing means as the size of the enumerated zones can be different. The first accessing means, represented by line 152, enters transition zone 2 at three points, T2, T4, and T7. Second accessing means, the motions of which are represented by line 153, desired to enter zone 2 at time T2; however, since first accessing means for one reason or another had priority, second accessing means waits until time T3 to enter zone 2. This time spacing relationship is a safety factor in preventing collisions between two rapidly moving high-powered accessing means. Line 154 represents the motions of a third accessing means. Adaptive programmed limits, for improved performance and accessing control are explained later.

Simplified Flowchart of Operations

Figure 13:
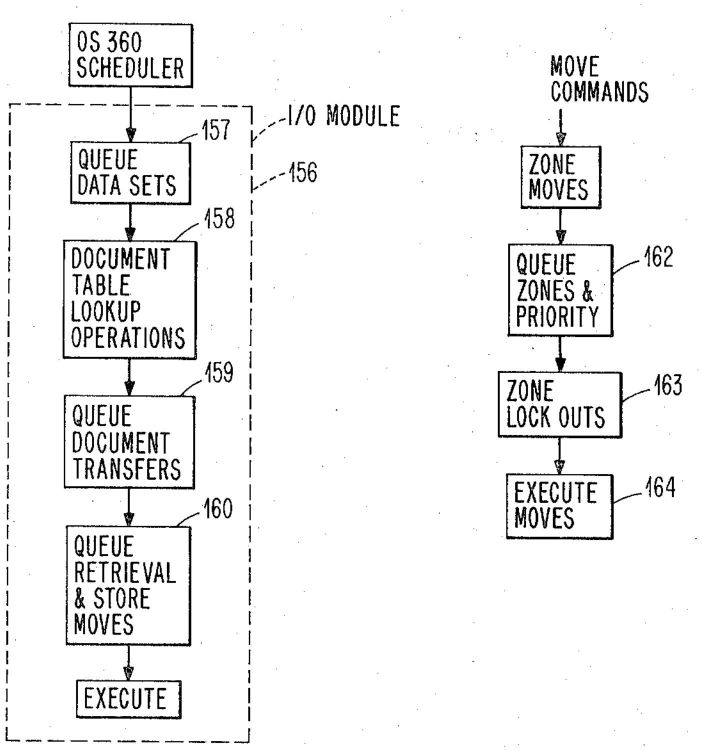
FIG. 13 is a simplified flowchart of a program for retrieving data from a library.

Referring next to FIG. 13, a program of operation is shown in greatly simplified flowchart form. This flowchart represents programs in the CPU's 112–114 and CU's 115–118 in FIG. 7 and some programming in CU 44. All the CPU's operate using OS–360 which has a scheduler for calling and assigning tasks. Within OS-360, there is an I/O program module 156 designed to operate with the FIG. 7 illustrated library. This module is resident in CPU 112. The sequence of operation is to first queue calls from CPU's 113 and 114 for data sets at 157. Queuing is performed in CPU 112. CPU 112 responds to such requests in accordance with priorities designated in accordance with operating system design. CPU 112 then either queues them in accordance with the priority or time of receipt, as appropriate. Then, at 158, CPU 112 matches the data-set identifications with the physical location(s) of the data within array 10. CPU 112 then lodges such location identifications or addresses in a data set queue. At 159, CPU 112 queues the document transfers in accordance with linear programming techniques. As will become apparent, these actions queue the document transfers and have a secondary relationship to the actual successive movements of carriages 13 and 14.

In accordance with system design considerations, step 160 may be performed either in CPU 112 or in CU 44. In any event, the program receives the queued document transfers and then queues and sequences the retrieval and store moves also using programming techniques. The sequence of moves is designed to, within priority constraints, minimize the movements of carriages 13 and 14 for maximizing cartridge transfer rates between storage compartments, media-processing stations, and a manual entry station. Such sequencing may include hierarchal system transfers between sets of libraries and cartridge-staging points. MOVE commands are generated based upon such queuing and programming analysis. MOVE commands may be first grouped in accordance with array zoning, 0–7, as described with respect to FIG. 12. This action assigns a carriage and identifies media-processing stations with respect to the moves. Such zones and priorities are then queued (based on activity) at 162. Zone lockouts are checked at 163; and then, at 164, instructions are forwarded to the carriages by CU 44 to execute the moves.

Because of the large number of variables involved and the desired optimization, the programs represented in FIG. 13 are very extensive and complex. However, one may practice the present invention without such optimizing procedures. The referred-to-programming techniques may take any one or more of several approaches, combinations of approaches, or hybrid techniques. These approaches include, without limitation, linear programming, queuing theory, Monte Carlo techniques, and any form of operation research approaches.

An Example of Cartridge Fetching

Figure 14:
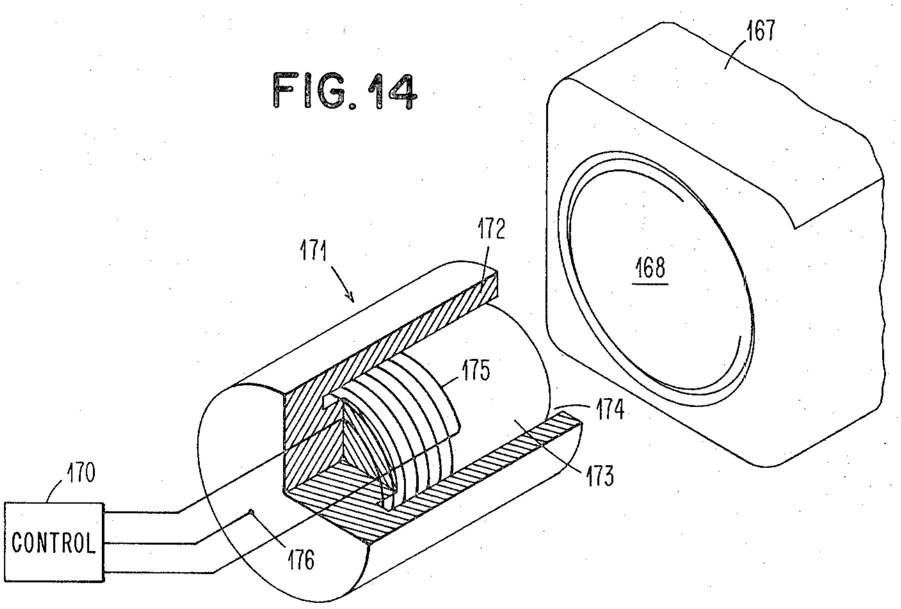
FIG. 14 diagrammatically illustrates retrieving a cartridge from a storage compartment or terminal.

Referring to FIG. 14, an exemplary method of fetching cartridges and storing same is shown. Cartridge 167 which contains a roll of magnetic media, such as shown in the Badum et al patent, supra, has one end portion on which a circular magnetically permeable metallic disc 168 is secured to a spool (not shown) inside the cartridge. Disc 168 has nonretentive magnetic properties. The cartridge picker on the respective carriages 13 and 14 et seq is controlled by a set of electronic circuits 170 carried on the carriage, preferably in the respective elevators. The picker itself consists of an annular coaxial electromagnet 171 having an outer ring-type electrode 172 which extends as a tube over the entire electromagnet for shielding same from affecting magnetic records in the library. Inner pole 173 extends coaxially with the outer pole 172 forming a narrow annular flux fringing gap 174. Winding 175 is disposed around inner pole 173 gap 174. The electromagnet has a closed magnetic path, except for gap 174. To fetch cartridge 167, electromagnet 171 is pressed against disc 168; the pressure is sensed by a suitable sensor represented by dot 176. Winding 175 is energized only after the pressure has been exerted on the cartridge. The magnetic shielding of disc 168 prevents the picker electromagnetic flux from affecting the cartridge-contained magnetic records, and the magnetizing force enables the picker to move cartridge 167 into a holding mechanism (not shown) of suitable design. Once cartridge 167 is in the holder, the holder releasably holds the cartridge on the carriage enabling the electromagnet to be de-energized. In moving cartridge 167 into a storage compartment, the electromagnet may either be or not be energized in accordance with the design of the holder. Such holder may have fingers extending outwardly which releasably grasp the sides of cartridge 167. A fast movement of the picker in the direction of the arrow 177 and an immediate reversal enables the cartridge 167 to be effectively thrown" into the storage compartment or terminal. The detents within the terminal are then used to stop the cartridge at a precise location.

Program Controlled Accessing

Electronic control of accessing and providing variations in accessing techniques and methods is much faster and more flexible than the mechanical restraints and schemes described with respect to FIGS. 1–11. It is preferred that the electronic portion of the data processing system be able to control the accessing mechanisms in such a manner as to minimize travel time and yet provide extreme flexibility in accordance with the discussion below. In the below flowchart it is assumed that each accessing mechanism operates independently within its assigned zone of storage and retrieval, such zones being overlappable under program means. For example, referring to FIG. 1, carriage 13 under one set of circumstances may access those cartridges within X address zone 000–300 while carriage 14 accesses the rest of the array. This indicates that the data contained in the documents within address 000–300 has a higher rate of usage than in the rest of the array. Because of the higher rate of usage, carriage 13 might have to deliver cartridges from the X address zone to a plurality of article-processing stations which lie within the carriage 14 zone. Accordingly, the delivery by carriage 14 of the fetched cartridges from the storage array may extend up to X address 500, for example. In this instance, CU 44 and CPU 112 must be carefully programmed to avoid delays and collisions of the two carriages. In one mode of operation, the moves may be queued such that carriages 13 and 14 move primarily in the same direction at the same time. Other schemes, of course, also can be used. Determination of the size of the zone serviced by each of the accessing mechanisms within the array is in accordance with the flowchart set forth below. This flowchart is simplified to avoid the situation of determining how many processing stations should be dynamically assigned to a given zone of the storage array. The principles involved can be used to make that latter determination. The actual moves by the access mechanisms are computed and commanded by a separate program. The present flowchart shows one program for supervising and establishing guidelines for the program or programs actually calculating the moves.

Step 1. Tally accesses the number of cartridges fetched by carriages 13 and 14 are tallied. Note that each access may be either one or two moves depending upon how well CPU 112 is programmed. The tally is directed toward the number of cartridges rather than the number of moves.

Step 2. Tally transfers—This step is performed whenever a zone in the array is set up such as transition zone 18 for transferring cartridges from one carriage to the other. This usually will be a small number during a given operating period. The present invention can be practiced without a transition zone; and, hence, this step is optional in accordance with system design.

Step 3. Check Tally Limit—The tallies accumulated in Step 1 are compared with a threshold K1. As any of the tallies equal K1, then Step 4 is executed. Otherwise, Step 1 is repeated. Additionally, a time-out may be provided such that the zones are re-evaluated during a predetermined time such as every ten seconds. Upon a time-out, Step 4 is also executed.

Step 4 Compare—The tallies of all the accessing mechanisms are compared for determining the difference in number of cartridges accessed in the FIG. 1 illustration. The number of accesses by carriage 13 is compared with carriage 14. If this difference is greater than constant K2, then the zone of accessing is shifted. If K2 is less than constant R2, but greater than R1, then the zone is shifted eight compartments along the X dimension enlarging the zone associated with the carriage having the fewer number of cartridge accesses. However, if the difference is greater than constant R2, but less than a larger constant R3, then the zone is shifted sixteen compartments. If the difference is greater than constant R3, the zone is shifted 24 compartments along the X axis. Upon completion of the step, reset the time-out if it is used and return to Step 1. All of the tallies are erased to zero.

The above flowchart may be interleaved among other computer programs within CPU 12 used to operate the illustrated data processing system. It may be used in a system where there are no physical constraints between the various accessing mechanisms. In the alternative, a plurality of physical restraints may be spaced along the array and sequentially actuated in accordance with the shift or the accessing zones. In the event that a compartment zone has a different size, then within the article-processing station zone, care must be exercised in actuating such physical restraints.

Array Interleaved Independent Systems

In systems where high performance is desired, and yet cost is desired to be minimized, certain costs can be reduced by minimizing the multiplexing between the CPU's, various CU's, and the article-processing stations. Referring to FIG. 7, CPU 113 is connected to CU's 115 and 116 while CPU 114 is connected to CU's 117 and 118. CPU 112, which controls the article-transfer operations, is connected to all CU's as well as CU 44. It is desired that CPU 113 will be able to operate with any portion of the array; that is, with article-processing stations 110 spaced along the entire length of array 12. This can be done if a large multiplexing switch is interposed between the four CU's 115, 116, 117, and 118 and the article-processing stations 110. By limiting the access of CU's to one-half of the article-processing stations, the cost of multiplexing and resultant support programming is greatly reduced. In such a situation, the various article-processing stations associated with CU's 115 and 116 are alternated along the length of the array. The same is true for CU's 117 and 118. For example, if the article-processing stations are sequentially assigned numbers in the left-hand end to the right-hand end, CU's 115 and 116 can operate with all odd-numbered article-processing stations while CU's 117 and 118 operate with even-numbered article-processing stations. In this manner, CPU 113 and CPU 114 can operate with documents located anywhere within the array with a simplified multiplexing scheme between the various CU's and the multiplicity of article-processing stations without requiring transfer between the various accessing mechanisms to move the cartridges from one portion of the array to another. This latter scheme reduces cost and enhances performance while simplifying programming support.

Programmed Security

When a large number of independent operating CPU's are included in a data processing system, a certain amount of security is necessary to ensure that the data sets stored in the documents in an array are accessible only to authorized personnel and their programs. In this regard, CPU 112 has a key word table lookup with associated array addresses. For example, a data set consisting of 65 documents may be accessible only when the requesting CPU supplies the key word EST ASCAVOIR. Only after a match of the key word, will CPU 112 forward a MOVE command request to CU 44.

For greater security, CU 44 may have a secondary key word and may control the fetching of the cartridge via one of the two flexible cables 26 or 27. In this regard, CU 44 may receive a second key word from the requesting CPU before it will permit the cartridge-accessing mechanism to fetch the cartridge. For example, the secondary key word may be NISI PRIUS. Upon receiving the secondary key word, CU 44 will permit the articles to be fetched within that zone for a given request.

Priority for Fetching Articles

CPU 112 has a table lookup scheme by address zones or list and the above-mentioned security keys for scheduling cartridge fetching in accordance with a priority. Priority schemes for maximum efficiency of the retrieval system may be on a time-out basis. That is, the top priority request must be fulfilled within a given time; however, if CPU 112 determines that a lower priority fetch can be accomplished before the high priority fetch without violating the time-out restrictions, both fetches are accomplished. Alternatively, the priority may be a simple straight priority. Such priorities are useful in multi-computer setups for coordinating operations and ensuring high priority data processing jobs are efficiently performed. Priority may be assigned based upon the computing capacity of a given CPU.

As used herein, the term "document" is primarily intended to indicate magnetic recording media; however, the present invention can be practiced with equal facility with microfilm or any other form of indicia-bearing documents. Also, it may be used in article-retrieval and storage schemes of all types, particularly where high performance with flexible control is desired. In an image system, the term "document" usually refers to one image. In that context, a large number of documents is preferably stored in each document-containing article. In further aspects, multiple arrays, multiple access ports (article-processing stations) for a data processing system, and multiple means for storing and fetching data-containing articles are operationally interrelated in accordance with this invention to provide enhanced data processing operations. The exact physical configuration is not critical nor important for successful practice of this invention.

While the invention has been particularly shown and described with reference to preferred embodiments thereof, it will be understood that any person skilled in the art may make any modification of form or detail without departing from the spirit and scope of the invention.

What is claimed is:

1. An accessing system for an X-Y array of storage compartments, a single travel path extending along and coextensive with the array, the improvement including in combination:

a plurality of accessing means each simultaneously movable entirely along said single travel path for accessing any one of said compartments, and a positioning control for receiving commanded movements and having means enabling movements of said accessing means along said single travel path for successive accesses to a given one of said compartments by two different ones of said accessing means, and automatic warning means responsive to said accessing means movements and locations for indicating to said positioning control means possible interference between said accessing means.

2. The system set forth in claim 1 further including mechanical limit means, limit control means responsive to a given one of said accessing means being in said transition zone to actuate said mechanical limit means to block others of said accessing means from entering said transition zone for preventing interference between said accessing means and said mechanical limit means including mechanical barriers selectively interposable on said single travel path.

3. The apparatus set forth in claim 1 further including manual entry station means in said array and located centrally of the length of said single travel path for manually entering and retrieving articles therefrom such that either accessing means has selective access to said manual entry station means.

4. The system set forth in claim 1 wherein said automatic warning means for indicating interference includes an automatically actuable mechanical barrier between adjacent ones of said accessing means, and a manual entry station adjacent said barrier having ingress and egress ports respectively on opposite sides of said barrier such that said accessing means can retrieve and store articles in said manual entry station independent one of the other.

5. The system set forth in claim 1 further including a plurality greater than said plurality of accessing means of record document recording and reproducing stations adjacent said X-Y array, exchanging means in said array operatively associated with each said recording and reproducing station for automatically exchanging record documents therewith, any of said accessing means capable of accessing any of said record document stations via said exchanging means such that any article in any storage compartment can be conveyed to any record document station by any of said accessing means, and said storage compartments storing document-containing articles transferrable to and from any of said plurality of record document recording and reproducing stations.

6. The system set forth in claim 5 further including an article manual entry station dividing said X-Y array into two portions, each portion extending along approximately one-half of said single travel path, said article manual entry station being capable of receiving a plurality of said record document-containing articles, and the number of said accessing means being two, and said article entry station having an ingress and an egress port in each of said portions respectively for said accessing means such that either of said accessing means can simultaneously access said manual entry station.

7. The system set forth in claim 1 further including document-containing articles stored in said storage compartments, respectively, and further including a plurality of automatic document-processing stations for recording and reproducing signals on a document in said article and being disposed adjacent said X-Y array of storage compartments, each document-processing station having ingress/egress ports extending through said X-Y array replacing storage compartments whereby said accessing means can deposit and retrieve document-containing articles to and from said processing station and said storage compartments, and manual entry station means in said storage array having ingress and egress ports also replacing some of said storage compartments whereby document-containing articles can be inserted and retrieved from said X-Y array, and all said compartments being accessible only by said plurality of accessing means.

8. The system set forth in claim 1 wherein each of said storage compartments is for storing a record document-containing article, a pluralty of document-processing stations for recording data signals on and reproducing data signals from a document contained in such articles, each said accessing means being capable of accessing each said document-processing station for exchanging said record document-containing articles therewith, a single programmable machine connected to said document-processing stations and said accessing means a programmable control unit electrically interposed between said document-processing stations and said single programmable machine, and a programmable control unit electrically interposed between said accessing means and said single programmable machine.

9. An accessing system having an array of storage compartments accessible from one open side of the array;

a single travel path extending along and coextensive with the array adjacent said one side;

the improvement including in combination:

a plurality of accessing means each simultaneously movable along said single travel path for accessing any one of said compartments;

a plurality of document-processing units adjacent said array opposite said one side;

a port means extending between said one side and each of said document-processing stations for automatically exchanging articles therewith and appearing as a storage compartment to each said plurality of accessing means and accessible by any one of said accessing means for exchanging documents in the same manner as such documents are exchangeable with said compartments a parking area abutting each end of said single travel path remote from said compartments and each being capable of receiving one of said accessing means such that a second one of said accessing means can access all of said compartments; and an electronic circuit cabinet for housing electrical circuits operatively a portion of said system and abutting one end of said array and being disposed adjacent one of said parking areas.

10. The system set forth in claim 9 wherein said single travel path includes a single track means extending along the array, each accessing means comprising a carriage movable on said track means including elevator means movable perpendicular to said track means for accessing any compartment within said array, said track means extending outwardly beyond the array for said parking areas;

said carriages and said elevators having an extent greater than any of said storage compartments such that when accessing any one of said storage compartments, no adjacent storage compartments can be simultaneously accessed by another of said accessing means; and warning means sensing movements and location of said plurality of accessing means for indicating possible interference therebetween.

11. The system set forth in claim 10 further including a single manual entry station in said array having manual access ports for manual entry and said accessing means exclusively accessing all said compartments and said port means.

12. The system set forth in claim 9 including a container for each said document, and a single manual entry station adjacent one of said parking areas and having input and output ports accessible by at least one of said accessing means and including means connected to said input and output ports permitting manual entry and removal of said containers from said manual entry station remote from said single travel path.

13. An article transfer apparatus for an information library system including an X-Y array of storage compartments having an open side and for receiving information-containing articles, the improved combination including:

a first plurality of delivery ports extending through the array from the open side to the other side and evenly spaced along the array for exchanging information-containing articles therethrough;

a travel path extending along said open side including a carriage support means coextensive with the array along one dimension thereof; and a plurality less than said first plurality of physically independent carriage means, each said independent carriage means movably on said support means and being simultaneously movable along said array and capable of selectively accessing any one of said ports or storage compartments and each said independent carriage means including means movable transverse to said supporting means, and each said independent accessing means having accessing means for exchanging articles with said compartments and ports.

14. The library set forth in claim 13 further including positioning control means operatively associated with said independent carriage means for sensing motion and horizontal location of said carriage means; and warning means responsive to said location for indicating impending interference between said carriages.

15. In combination, an information library arrangement including an X-Y array of storage compartments having an open side for receiving and storing information-containing articles;

a plurality of pneumatic dispatch means extending through said array;

a like plurality of information-containing article-handling apparatus, each said apparatus including data signal means for exchanging data signals with an article being processed, and respectively operatively associated with said pneumatic dispatch means for exchanging information-containing articles therewith;

a plurality less than the first-mentioned plurality of accessing mechanisms movable along said open side for exchanging articles with said compartments and with said pneumatic dispatch means; and positioning control means for independently and simultaneously operating said accessing mechanisms.

16. The arrangement set forth in claim 15 further including in combination:

a second X-Y array of storage compartments remote from the first-mentioned array, said second array having compartments for storing said articles and an open side;

article transferring means extending between said arrays for exchanging articles therebetween;

additional accessing mechanisms movable coextensively with said second array open side for selectively accessing said compartments for exchanging articles therewith;

all of said accessing mechanisms movable to said transferring means for exchanging articles therewith.

17. The arrangement set forth in claim 16 further including in combination:
said transferring means comprising pneumatic dispatch means extending between said X-Y arrays and having article orienting reversing means for maintaining the article orientation identical with respect to said open side in either of said arrays.

18. The arrangement set forth in claim 16 further including in combination:
both said open sides being oppositely facing and said arrays being aligned at least adjacent said transfer means; and
said transfer means having a substantially straight line article-transfer path between said arrays.

19. An article transporting system for an X-Y array of storage compartments, each compartment for storing an information-containing article;
a first plurality of input and output portions disposed in said array;
a second plurality of accessing mechanism movably disposed with respect to said array for transferring articles between said portions and said compartments, each accessing mechanism capable of transferring an article between any of said portions and any of said compartments;
a first plurality of article-processing stations for automatically exchanging articles with said portions, disposed along said array opposite said travel path, and consisting of means for recording signals on and reproducing signals from said article;
automatic means in each said portions responsive to receiving an article to independently transfer such article between said array and said article-processing stations, respectively;
means for transferring information signals to and from said processing stations; and
means responsive to said automatic means for indicating that an article has been transferred to said array such that operation of one of said accessing mechanisms can be inititated.

20. An article storage and retrieval apparatus having a pair of facing open-faced substantially coextensive X-Y arrays of article storage compartments, each compartment having a unique address, a plurality of article-receiving and sending ports disposed in one of said X-Y arrays and each port having a unique address,
the improvement including in combination:
said ports being grouped into small groups of side-by-side sending and receiving ports and said groups being evenly distributed along in a spaced-apart relation along one axis of one of said X-Y arrays;
a travel path support means coextensive with said arrays along said open faces and disposed between said arrays;
a plurality of document-processing stations for recording data signals on and reproducing data signals from a document contained in such articles, each of said stations being respectively operatively connected to a pair of said sending and receiving ports for receiving an article and removing a portion of a document from the article for transporting same to facilitate said recording and reproducing;
a single programmable machine connected to said accessing means for controlling same;
a plurality of accessing means each movably mounted on said travel path support means capable of accessing each said document-processing station and each said storage compartment for exchanging said record document-containing articles therewith;
a programmable control unit electrically interposed between said document-processing stations and said single programmable machine; and
a programmable control unit electrically interposed between said accessing means and said single programmable machine.

21. The apparatus set forth in claim 20 having two of said accessing means,
the improvement further including in combination:
said travel path support means extending outwardly from between said X-Y arrays at each end a sufficient extension distance to allow one of said accessing means to move into one of said extensions and be free from said X-Y arrays; and
an electronic module containing one of said programmable control units and disposed at one end of one of said X-Y arrays and adjacent one of said travel path support means extensions.

22. The apparatus set forth in claim 20 having two of said accessing means,
the improvement further including in combination:
said travel path support means extending outwardly from between said X-Y arrays at each end a sufficient distance to allow one of said accessing means to move into one of said extensions and be free from said X-Y arrays; and
a manual entry station having an article sending and receiving port for exchanging articles with said accessing means disposed at one end of one of said X-Y arrays and extending outwardly therefrom parallel to one of said travel path support means.

23. The apparatus set forth in claim 20 having two of said accessing means,
the improvement further including in combination:
said travel path support means extending outwardly from between said X-Y arrays at each end a sufficient extension distance to allow one of said accessing means to move into one of said extensions and be free from said X-Y arrays;
a manual entry station disposed at one end of a first one of said X-Y arrays and having a portion extending parallel to and adjacent to a first of said travel path support means extension and having a sending and receiving port for exchanging articles with said accessing means;
an electronic module including one of said programmable control units disposed at one end of a second one of said X-Y arrays and having a portion extending parallel and adjacent to said first travel path support means extension; and
said groups of ports being vertically aligned such that two receiving or two sending ports can be accessed without accessing means movement along said travel path support means.

24. The apparatus set forth in claim 23 further including in combination:
each said accessing means having a given extent along said travel path with a vertically extending elevator at an end portion thereof facing the other accessing means such that when a first one of said accessing means is in a one of said travel path support means extension, the elevator of a second one of said accessing means is on that portion of said given extent closest to said one travel path support means extension.

25. An article storage and retrieval apparatus having a pair of facing open-faced substantially coextensive X-Y arrays of article storage compartments, each compartment having a unique address, a plurality of article-receiving and sending ports disposed in one of said X-Y arrays, each said port having a unique address, the improvement including in combination:

each one of said sending ports being disposed immediately adjacent one of said receiving ports to constitute an I/O pair of ports;

a group consisting of a small plurality of said I/O pairs of ports being disposed along a vertical axis in said one X-Y array said groups being evenly spaced along a horizontal axis of said one X-Y array;

a single travel path support means extending parallel to said horizontal axis substantially coextensively with said one X-Y array;

a plurality of carriages, each with a vertically extending elevator, movably mounted on said travel path support means; and positioning means to control said carriages.

26. The apparatus set forth in claim 25 wherein said travel path support means has a pair of parking areas disposed respectively beyond opposite horizontal ends of said one X-Y array; and a manual entry station disposed adjacent said travel path support means at one horizontal end of one of said X-Y arrays and including one sending and one receiving port.

27. The apparatus set forth in claim 26 wherein the number of groups of ports is greater than the number of carriages.

* * * * *